(12) United States Patent
Baker

(10) Patent No.: US 8,408,629 B2
(45) Date of Patent: Apr. 2, 2013

(54) ROTATIONAL VARIABLE TORQUE DAMPER FOR A SEAT ASSEMBLY FOR A VEHICLE

(75) Inventor: Jason Miles Baker, Pell City, AL (US)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 12/876,561

(22) Filed: Sep. 7, 2010

(65) Prior Publication Data

US 2012/0056460 A1    Mar. 8, 2012

(51) Int. Cl.
*B60N 2/10* (2006.01)
(52) U.S. Cl. .................... 296/65.09; 188/290
(58) Field of Classification Search ............... 296/65.01, 296/65.05, 65.09; 188/290; 267/223
See application file for complete search history.

(56) References Cited

U.S. PATENT DOCUMENTS

| | | | |
|---|---|---|---|
| 5,165,506 A * | 11/1992 | Guimbretiere | 188/290 |
| 7,275,626 B2 | 10/2007 | Fukuzawa et al. | |
| 7,597,375 B2 | 10/2009 | Takatsura et al. | |
| 2006/0207844 A1 | 9/2006 | Koizumi et al. | |
| 2009/0266660 A1 | 10/2009 | Saito et al. | |

FOREIGN PATENT DOCUMENTS

| | | |
|---|---|---|
| JP | 2008039085 | 2/2008 |
| JP | 2008144779 | 6/2008 |

\* cited by examiner

*Primary Examiner* — Joseph Pape
(74) *Attorney, Agent, or Firm* — Rankin Hill & Clark LLP

(57) ABSTRACT

A variable torque rotary damper for a vehicle seat comprises a housing defining a non-uniform chamber for retaining therein a viscous fluid. A rotor has an axial portion extending at least partially into the chamber and a resistive portion extending radially from the axial portion for moving through the viscous fluid within the chamber. When torque is applied to the rotor resulting in rotation of the resistive portion through the viscous fluid, a resistant force being applied by the viscous fluid on the resistive portion increases or decreases proportionally relative to a position of the resistive portion within the non-uniform chamber.

19 Claims, 3 Drawing Sheets

US 8,408,629 B2

ROTATIONAL VARIABLE TORQUE DAMPER FOR A SEAT ASSEMBLY FOR A VEHICLE

BACKGROUND

Exemplary embodiments herein relate to a seat assembly for a vehicle, and more particularly, to a rotational damper for a vehicle seat assembly configured to vary the torque as a seat base is moved between a seated position and a stowed position.

Many sedans, coupes, CUVs, and SUVs have rear-folding seats and/or fold-and-tumble seats. Such rear seats include a seat base and a seatback pivotally connected to the seat base. The seatback can be moved from an upright, seated position to a folded position where the seatback is generally parallel to the seat base. The seat base can be moved from a seated position, and together with the folded seatback, to a stowed position. In the stowed position, the seat base and seatback are disposed generally parallel to each other, and also generally perpendicular or generally parallel to the vehicle floor.

Rear-folding seats also typically include a rotational damper associated with the seat base to dampen the movement of the seat base from the seated position to the stowed position. This known rotational damper generally has the same torque value for multiple revolutions in both directions of rotation. More particularly, the known rotational damper includes a housing defining a chamber for holding therein a viscous fluid. Disc-shaped fins are rotationally supported within the housing chamber. The chamber is uniform such that the torque values are approximately the same in both directions of rotation. Therefore, with this construction, the conventional rotational damper operates within one revolution range and cannot provide variable torque values to the seat assembly as the seat base is being moved from the seated position to the stowed position. This can cause the seat base and seatback to fall towards the stowed position or back toward the seated position at an undesirable rate depending on whether the stowed position is generally parallel or perpendicular to the vehicle floor.

SUMMARY

According to one aspect, a variable torque rotary damper for a vehicle seat comprises a housing defining a non-uniform chamber for retaining therein a viscous fluid. A rotor has an axial portion extending at least partially into the chamber and a resistive portion extending radially from the axial portion for moving through the viscous fluid within the chamber. When torque is applied to the rotor resulting in rotation of the resistive portion through the viscous fluid, a resistant force being applied by the viscous fluid on the resistive portion increases or decreases proportionally relative to a position of the resistive portion within the non-uniform chamber.

According to another aspect, a damper associated with a hinge mechanism for a vehicle seat having a seat base and a seatback is provided. The seat base is connected to a floor of the vehicle via the hinge mechanism and is capable of moving between a seated position and a stowed position wherein a rear section of the seat base is rotated away from the vehicle floor. The damper comprises a housing defining a chamber for retaining therein a viscous fluid. A rotor has an axial portion and at least one fin connected to the axial portion for rotation therewith in the chamber. The rotor rotates as the seat base is moved between the seated position and the stowed position. A ramp is located within the chamber. The ramp provides for both a high torque resistance and a low torque resistance to the hinge mechanism via the rotor as the at least one fin rotates within the chamber.

According to yet another aspect, a vehicle seat assembly comprises a seat base connected to a vehicle floor. The seat base is capable of moving between a seated position and a stowed position wherein a rear section of the seat base is rotated away from the vehicle floor. A hinge mechanism rotatably connects the seat base to the vehicle floor. A seatback is pivotally connected to the seat base. The seatback is capable of being folded toward the seat base. A rotary damper is operatively associated with the hinge mechanism. The damper includes a housing having a bottom wall, a top wall and a sidewall and defining a non-uniform chamber for retaining therein a viscous fluid. A rotor has an axial portion and a resistive portion for rotating through the viscous fluid within the chamber. The rotor rotates as the seat base is moved between the seated position and stowed position. At least one of the top wall and the bottom wall of the housing includes a ramp. The ramp provides for both a high torque resistance and a low torque resistance to the hinge mechanism via the rotor as the resistive portion rotates within the chamber. The torque being applied to the hinge mechanism increases or decreases proportional to a rotational position of the resistive portion with respect to the ramp.

DETAILED DESCRIPTION

It should, of course, be understood that the descriptions and drawings herein are merely illustrative and that various modifications and changes can be made in the structures disclosed without departing from the present disclosure. Like numerals refer to like parts throughout the several views.

Figure 1:
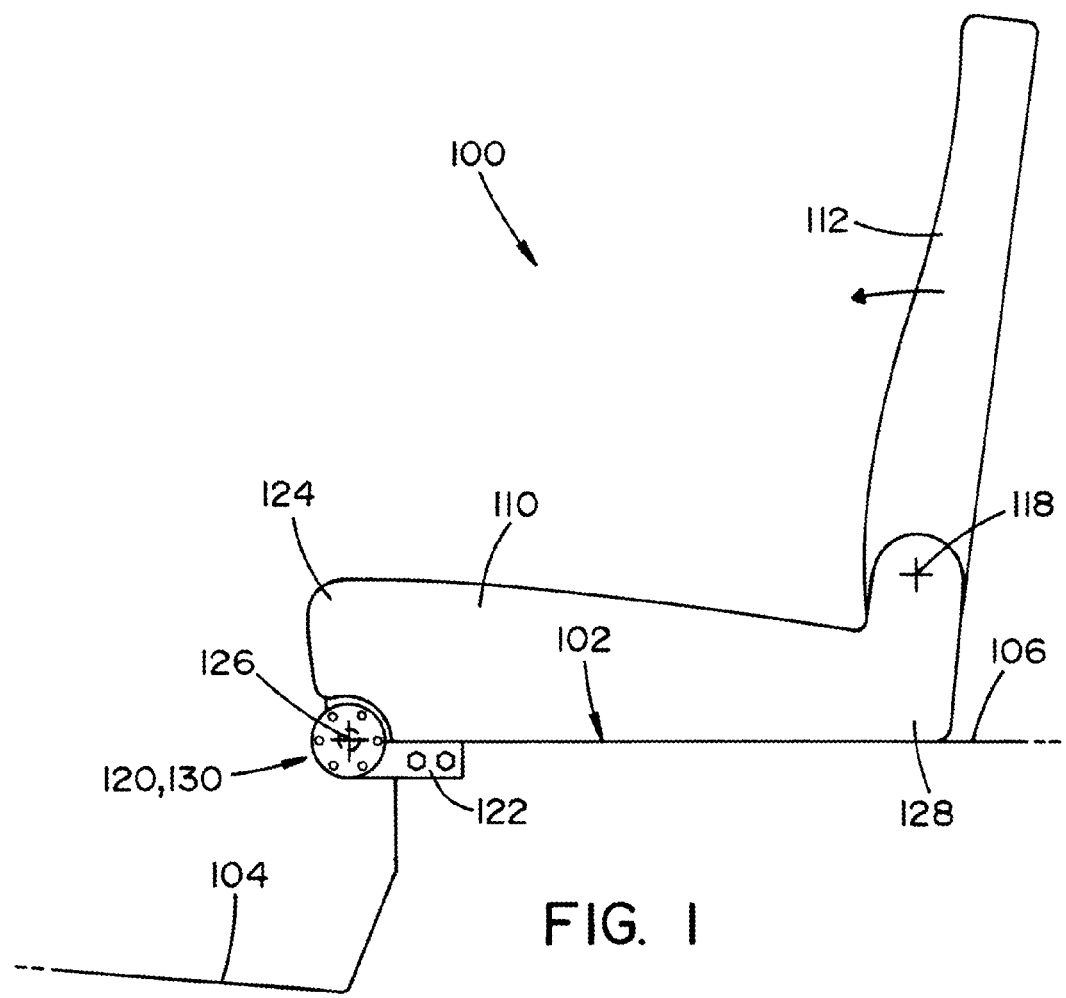
FIG. 1 is a schematic view of a seat assembly for a vehicle including an exemplary rotational variable torque damper according to the present disclosure. A seatback of the seat assembly is in an upright position and a seat base is in a seated position.
Figure 2:
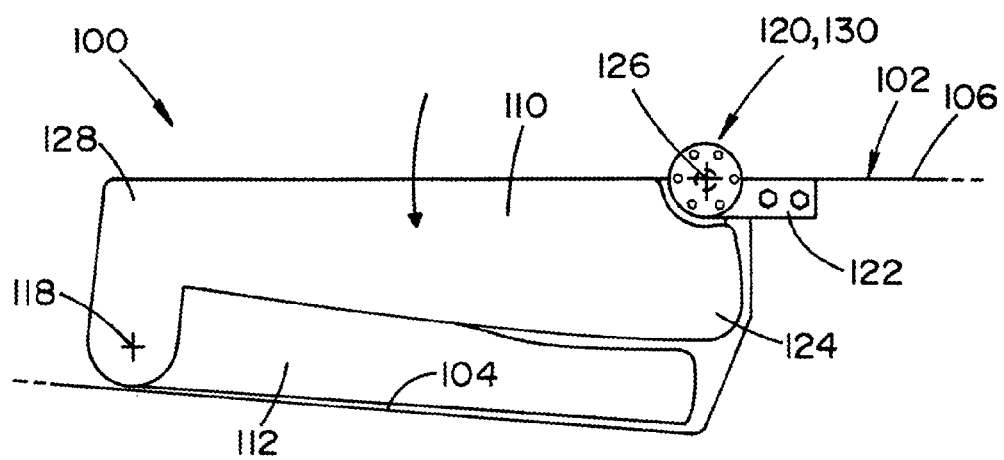
FIG. 2 is a schematic view of the seat assembly of FIG. 1 in a stowed position wherein both the seatback and seat base are generally parallel to a vehicle floor.

Referring now to the drawings wherein the showings are for purposes of illustrating one or more exemplary embodiments only and not for purposes of limiting the same, FIGS. 1 and 2 schematically illustrate a seat assembly 100 adapted for use in connection with a vehicle having an increased cargo and passenger-carrying capability. The depicted seat assembly 100 is generally used in vehicles having one or more side-mounted rear doors, in addition to the usual two front doors and possibly a tailgate member. The vehicle has a floor 102 defining a first platform 104 and a second platform 106, which is elevated relative to the first platform. In the depicted exemplary embodiment, the seat assembly 100 is a rear folding-seat assembly or a fold-and-tumble seat assembly. The seat assembly 100 can also be a split-bench/split-back type seat; though alternative seat configurations, such as bench-type seats or separated cabin-type seats, are contemplated. The seat assembly 100 includes a seat base 110 for supporting an occupant and a seatback 112 pivotally connected to the seat base 110 via a pivoting mechanism (not shown) for pivotal movement about a pivot axis 118. The seat base 110 is connected to the vehicle floor 102. Both the seat base 110 and the seatback 112 are capable of pivoting between a seated position (FIG. 1) and a stowed, folded position (FIG. 2).

As indicated above, the seat assembly 100 can employ a fold-and-tumble design that allows the seat back 112 to be folded down on the seat base 110 and then both the seat back 112 and the seat base 110 can be pivoted forwardly in the vehicle wherein the seat base 110 and the seatback 112 are disposed generally parallel to each other, and also generally parallel to the vehicle floor 102. A front section 124 of the seat base 110 is rotatably connected to the vehicle floor 102 via a hinge or pivoting mechanism 120 having a bracket 122 which is affixed to the vehicle floor. This hinge mechanism 120 permits a rear section 128 of the seat assembly 100 to tip or tilt forward within the vehicle about an axis 126 defined by the hinge mechanism. This allows both the seat base 110 and seatback 112 to move into the stowed or fold-and-tumble position, shown in FIG. 2. In this position, the seat base 110 and seatback 112 are disposed generally parallel to each other, and also generally parallel to the vehicle floor 102. Although, it should be appreciated that in the stowed position, the seat base 110 and the seatback 112 can be generally perpendicular to the vehicle floor 102. A seat latch assembly (not shown) can be provided on the rear section 128 of the seat base 110 for securing the seat base to the vehicle floor 102 in a manner known in the art. A high latch assembly (not shown) can be provided on the seatback 112 for securing the seatback in its upright position in a manner known in the art.

Figure 3:
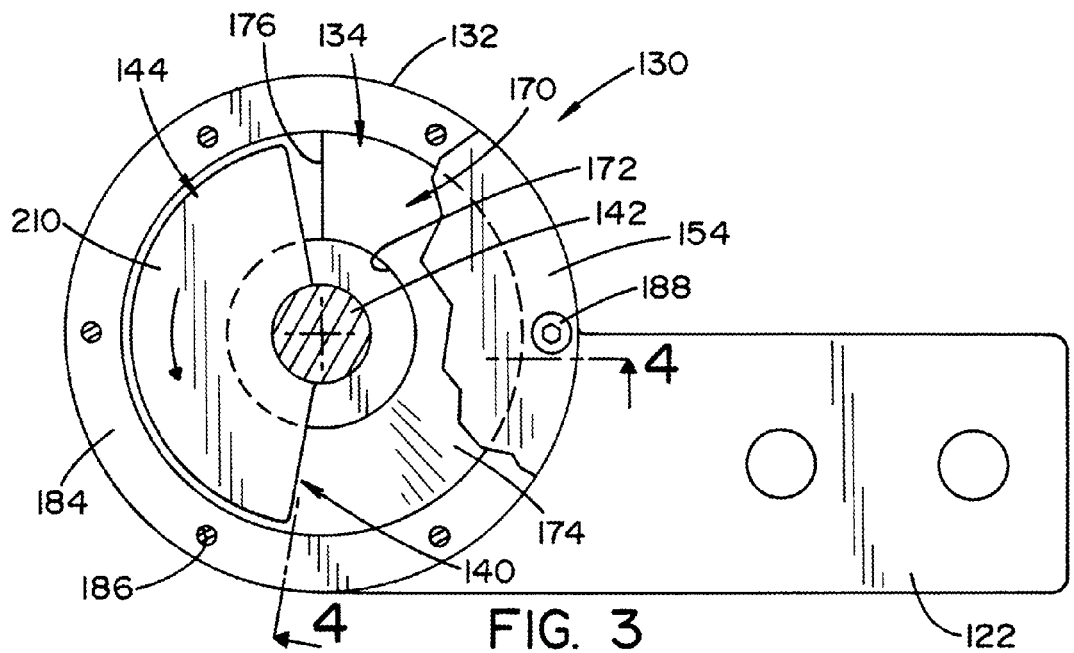
FIG. 3 is a schematic view, partially broken away, of the damper of FIG. 1.
Figure 4:
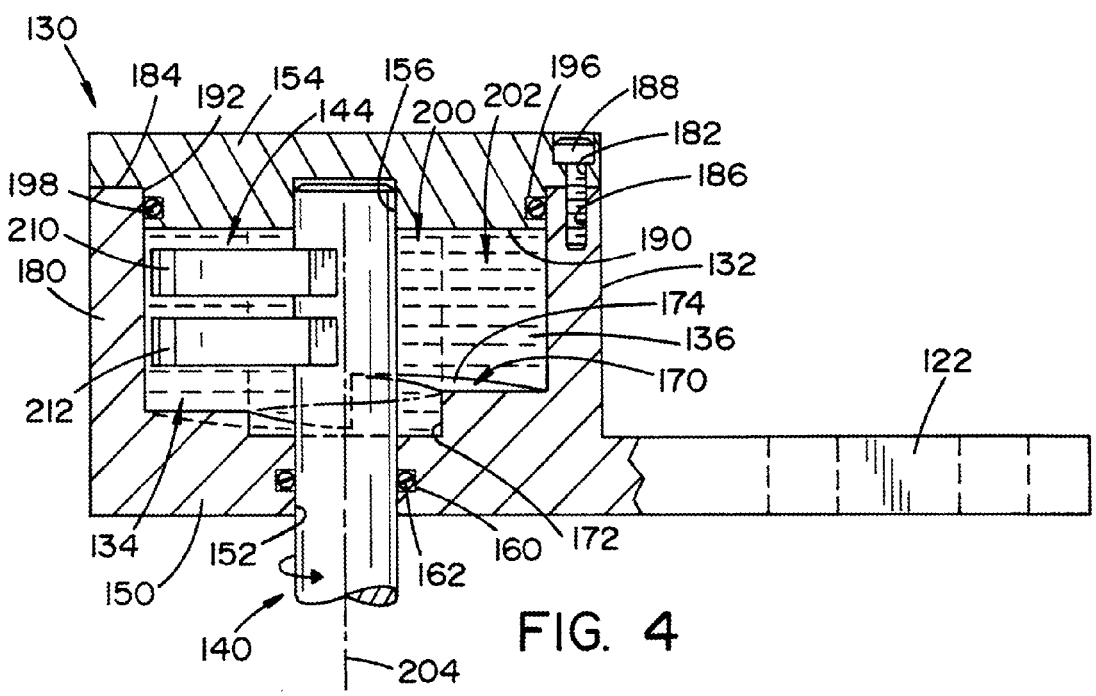
FIG. 4 is a cross-sectional view of the damper of FIG. 3 taken along line 4-4 of FIG. 3.
Figure 5:
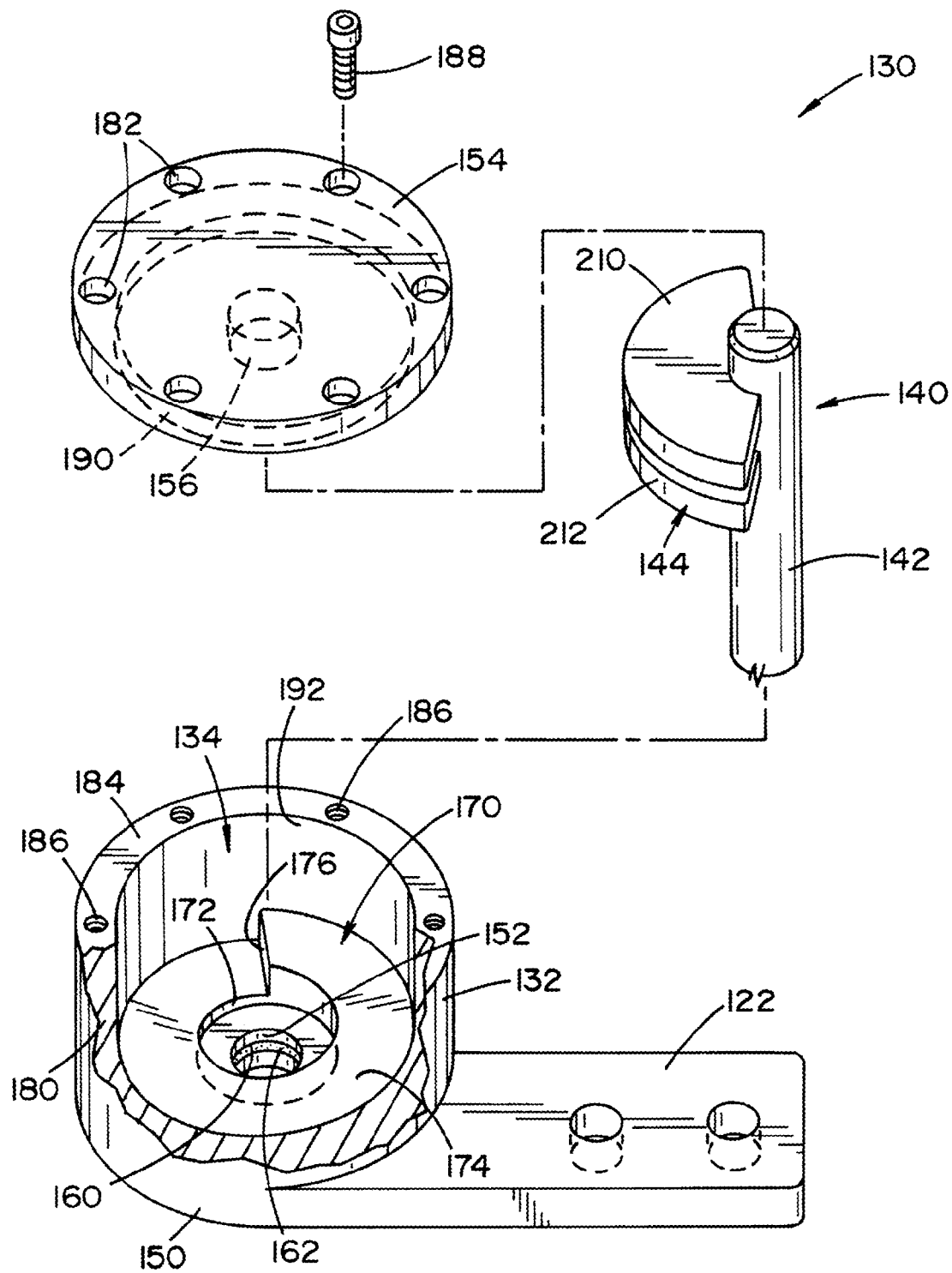
FIG. 5 is an exploded view, partially broken away, of the damper of FIG. 3.

With reference to FIGS. 3-5, a rotary damper 130 is operatively associated with the hinge mechanism 120. The depicted rotary damper includes a generally cylindrically shaped housing 132 and a rotor 140. The housing defines a non-uniform chamber 134 for retaining therein a viscous fluid 136. The rotor 140 has an axial portion 142 and a resistive portion 144. The axial portion 142 of the rotor 140 extends at least partially into the chamber 134. Particularly, a bottom wall 150 of the housing includes an opening or bore 152 in communication with the chamber 134 and a top wall 154 (per the orientation shown in FIG. 4) of the housing 132 includes a recess 156. The axial portion 142 is inserted through the opening 152 and at least partially into the recess 156. A groove 160 is provided in the bottom wall 150 and circumscribes the opening 152. A seal 162 is positioned within the groove 160 to prevent the viscous fluid 136 from leaking between the axial portion 142 and the bottom wall 150 of the housing 132. The resistive portion 144 extends radially from the axial portion 142 for moving through the viscous fluid 136 within the chamber 134. As will be described in greater detail below, When torque is applied to the rotor 140 resulting in rotation of the resistive portion 144 through the viscous fluid 136, a resistant force being applied by the viscous fluid on the resistive portion increases or decreases proportionally relative to a position of the resistive portion within the non-uniform chamber 134.

To provide for the variable torque resistance values, a ramp 170 is positioned within the chamber 134 of the housing 132. The ramp 170 provides for both a high torque resistance and a low torque resistance to the rotor 140 as the resistive portion 144 rotates within the chamber. Particularly, the ramp 170 is generally ring-shaped and at least partially surrounds the axial portion 142 of the rotor 140. In the depicted exemplary embodiment, the ramp 170 forms at least a portion of a surface of the bottom wall 150 of the housing, and can be integrally formed with the housing bottom wall. If desired, however, the ramp 170 can be disposed elsewhere within the chamber, such as the top wall 154. The ramp 170 includes a circular opening 172 having an axis coincident with a longitudinal axis of the housing 132 and a rotational axis of the axial portion 142. The ramp is provided with a generally helical fluid contact surface 174 and a wall 176 separates the low torque area from the high torque area. This allows the ramp 170 to have an increasing axial thickness along a first rotational direction of the resistive portion 144 within the chamber 134 (i.e., when the seat base 110 is moved from the seated position of FIG. 1 towards the stowed position of FIG. 2).

As shown in FIG. 4, the housing 132 includes the bottom wall 150, the top wall 154 and a sidewall 180. The top wall 154 can be removably connected to the sidewall 180 via conventional manners. In the exemplary embodiment, the top wall 154 includes a plurality of circumferentially spaced openings 182 and a top surface 184 of the side wall 180 includes a plurality of circumferentially spaced threaded openings 186, which are aligned with the openings 182. Fasteners 188 extend through the openings 182 and threadenly engage the openings 186. To prevent the viscous fluid 136 from leaking out of the chamber 134, the top wall includes a shelf 190 which contacts an internal surface 192 of the sidewall 180. A circumferential grove 196 is provided in the shelf 190 and a seal 198 is positioned within the groove. Although, it should be appreciated that the top wall 154 can be integrally formed with the sidewall 180. In this exemplary embodiment, a port can be provided in the housing 132, for example the sidewall 180, for injecting the viscous fluid 136 into the chamber 134. As discussed above, the ramp 170 could be located on the top wall 154, e.g., the ramp could extend into the chamber 134 from the shelf 190. Accordingly, the ramp can be provided on at least one of the bottom wall 150 and the top wall 154 of the housing.

As indicated previously, the ramp 170 provides for the non-uniform chamber 134, which, in turn, provides the high and low torque resistance values to the rotor 140. Particularly, the housing chamber 134 defines a first generally constant volume 200 and a second variable volume 202. Based on the location of the ramp within the housing, the second volume at least partially surrounds the first volume. The first volume 200 extends radially from a longitudinal axis 204 of the housing 132 toward the ramp 170 and is at least partially defined by the bottom wall 150 and the top wall 154. The second volume 202 extends radially from the first volume and is at least partially defined by the top surface 174 of the ramp 170 and the sidewall 180 and the top wall 154 of the housing.

With reference to FIGS. 4 and 5, the resistive portion 144 of the rotor 140 comprises at least one fin connected to the axial portion 142 for rotation therewith in the chamber 134 and through the viscous fluid 136. As shown, the at least one fin includes first and second, axial spaced fins 210,212 mounted to the axial portion 142. Each of the first and second fins has an arcuate length less than 360 degrees which allows for one revolution within the chamber 134 as the seat assembly 100 is moved towards the stowed position. In the depicted exemplary embodiment, the arcuate length of each of the first and second fins is less than 180 degrees. A fin or fins with an arcuate length of 360 degrees could be employed and the starting position of the fins can vary with respect to the ramp 170. As the seat base 110 is moved from the seated position towards the stowed position via the hinge mechanism, the damper 130 is adapted to transmit the movement of the seat base 110 to the axial portion 142 of the rotor 140 for rotating the resistive portion 144 (i.e., the first and second fins 210, 212) through the viscous fluid 136 within the chamber 134. The first and second fins 210,212 can have a single revolution (or less than a single revolution) within the chamber 134 as the seat base 110 is moved. The torque resistance applied to the rotor 140 by the viscous fluid 136 can increase as the seat base 110 is moved toward the stowed position.

Since the resistive force being applied by the viscous fluid on the fins 210,212 is inversely proportional to a gap between the walls of the housing 132 and the fins, when the fins are disposed over areas of the ramp 170 having a relatively thicker axial dimension, the torque resistance being applied by the viscous fluid 136 on the fins 210,212 is relatively higher (when the rotational velocity of the fins remains relatively constant) as compared to areas of the ramp having a thinner axial dimension. The fins 210,212 and the ramp 170 can be designed to provide a damping resistance to prevent the seat assembly 100 from slamming into the first platform 104 and the second platform 106. The fins 210,212 and the ramp 170 can be designed so that the resistance force being applied by the viscous fluid 136 increases when the seat assembly 100 is moving toward the stowed position (FIG. 2).

As is evident from the foregoing, to generate variable torque values, the present disclosure provides a rotational damper 130 having a non-uniform chamber 134. To this end, the housing 132 includes the ramp 170 which provides for both high and low torque resistance values to the hinge mechanism 120. Fins 210,212 are rotationally disposed within the non-uniform chamber and can have an arcuate length less than 360 degrees. As the seat base 110 is moved from the seated position towards the stowed position via the hinge mechanism 120, the fins 210,212 rotate within the chamber 134. As the fins rotate, the torque applied to the hinge mechanism 120 increases/decreases proportionally relative to the position of the fins with respect to the ramp shaped bottom surface.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A variable torque rotary damper for a vehicle seat having a seat base, comprising:
   a housing defining a non-uniform chamber for retaining therein a viscous fluid;
   a rotor having an axial portion extending at least partially into the chamber and a resistive portion extending radially from the axial portion for moving through the viscous fluid within the chamber, when the seat base is moved between a seated position and a stowed position torque is applied to the rotor resulting in rotation of the resistive portion through the viscous fluid, a resistant force being applied by the viscous fluid on the resistive portion increases or decreases proportionally relative to a position of the resistive portion within the non-uniform chamber; and
   the housing including a stationary ramp positioned within the chamber, the ramp providing for both a high torque resistance and a low torque resistance to the rotor as the resistive portion rotates within the chamber.

2. The rotary damper of claim 1, wherein the ramp is generally ring-shaped and includes a generally helical fluid contact surface.

3. The rotary damper of claim 2, wherein the ramp forms at least a portion of a bottom wall of the housing.

4. The rotary damper of claim 1, wherein the ramp has an increasing axial thickness along a first rotational direction.

5. The rotary damper of claim 1, wherein the housing chamber defines a first generally constant volume and a second variable volume which at least partially surrounds the first volume.

6. The rotary damper of claim 5, wherein the first volume extends radially from a longitudinal axis of the housing towards the ramp, the second volume being at least partially defined by a fluid contact surface of the ramp and a sidewall and at least one of a top wall a bottom wall of the housing.

7. The rotary damper of claim 1, wherein the resistive portion includes first and second fins mounted to the axial portion of the rotor, each of the first and second fins having an arcuate length less than 360 degrees.

8. The rotary damper of claim 1, wherein the damper is a damper associated with a hinge mechanism for a vehicle seat configured to fold-and-tumble, the vehicle seat including a seat base and a seatback rotatably connected to the seat base, the seat base being movable from a seated position to a stowed position via the hinge mechanism, wherein the damper is adapted to transmit movement of the seat base to the axial portion of the rotor for rotating the resistive portion through the viscous fluid within the chamber.

9. A damper associated with a hinge mechanism for a vehicle seat having a seat base and a seatback, the seat base being connected to a floor of the vehicle via the hinge mechanism and capable of moving between a seated position and a stowed position wherein a rear section of the seat base is rotated away from the vehicle floor, the damper comprising:
   a housing defining a chamber for retaining therein a viscous fluid;
   a rotor having an axial portion and at least one fin connected to the axial portion for rotation therewith in the chamber, the rotor rotating as the seat base is moved between the seated position and the stowed position; and
   a ramp located within the chamber, the ramp having an increasing axial thickness as the at least one fin rotates in a first direction within the chamber, the ramp providing for both a high torque resistance and a low torque resistance to the hinge mechanism via the rotor as the at least one fin rotates within the chamber.

10. The damper of claim 9, wherein the ramp provides for a non-uniform chamber.

11. The damper of claim 10, wherein the non-uniform chamber includes a first generally constant volume which extends radially from a longitudinal axis of the housing and is at least partially defined by a top wall and a bottom wall of the housing and a second variable volume which extends radially from the first volume and is at least partially defined by a top surface of the ramp and a sidewall and the top wall of the housing.

12. The damper of claim 9, wherein as the at least one fin rotates within the chamber, the torque being applied to the hinge mechanism via the rotor increases or decreases proportional to a rotational position of the at least one fin with respect to the ramp.

13. The damper of claim 9, wherein the at least one fin has an arcuate length less than 180 degrees.

14. The damper of claim 9, wherein the ramp is integrally formed with a bottom wall of the housing.

15. The damper of claim 9, wherein the ramp is generally ring-shaped and surrounds the axial portion of the rotor.

16. The damper of claim 15, wherein the ramp includes a generally helical fluid contact surface.

17. The damper of claim 9, wherein the at least one fin includes first and second identically shaped, axial spaced fins.

18. The damper of claim 9, wherein the at least one fin has a single revolution within the chamber as the seat base is moved from the seated position to the stowed position, the torque being applied to the hinge mechanism increasing as the seat base is moved toward the stowed position.

19. A vehicle seat assembly comprising:
- a seat base connected to a vehicle floor, the seat base capable of moving between a seated position and a stowed position wherein a rear section of the seat base is rotated away from the vehicle floor;
- a hinge mechanism for rotatably connecting the seat base to the vehicle floor;
- a seatback pivotally connected to the seat base, the seatback capable of being folded toward the seat base; and
- a rotary damper operatively associated with the hinge mechanism, the damper including:
  - a housing having a bottom wall, a top wall and a sidewall and defining a non-uniform chamber for retaining therein a viscous fluid;
  - a rotor having an axial portion and a resistive portion for rotating through the viscous fluid within the chamber, the rotor rotating as the seat base is moved between the seated position and stowed position; and
  - wherein at least one of the top wall and the bottom wall includes a stationary ramp, the ramp providing for both a high torque resistance and a low torque resistance to the hinge mechanism via the rotor as the resistive portion rotates within the chamber, the torque being applied to the hinge mechanism increasing or decreasing proportional to a rotational position of the resistive portion with respect to the ramp.

* * * * *